Feb. 7, 1967  R. B. FREEMAN ETAL  3,302,281
METHOD OF FORMING A BRAZED SEAM
Filed July 29, 1964  2 Sheets-Sheet 1

INVENTORS
RICHARD B. FREEMAN
PAUL J. SPANGLER
BY Ely Pearne & Gordon
ATTORNEYS

INVENTORS
RICHARD B. FREEMAN
PAUL J. SPANGLER
BY

ATTORNEYS

United States Patent Office 3,302,281
Patented Feb. 7, 1967

3,302,281
METHOD OF FORMING A BRAZED SEAM
Richard B. Freeman, Cleveland, and Paul J. Spangler, University Heights, Ohio, assignors to ETC Incorporated, Cleveland, Ohio, a corporation of Ohio
Filed July 29, 1964, Ser. No. 386,022
5 Claims. (Cl. 29—482)

This invention relates to brazing techniques and, more particularly, to the configuration of abutting surfaces which are to be brazed.

The invention is particularly concerned with techniques for brazing the longitudinal butt seam in tubes, such as the longitudinal seam in the ferrule portion of an electrical connector. Such electrical connectors may have a connector portion at one end and a tubular ferrule portion at the other end. The connector portion may be, for example, a flat ring tongue connector for attachment to the binding post of an electrical device and the tubular ferrule portion receives the bared end of an electrical conductor so that the connector may be attached to the connector by cold forging these elements into electrical and mechanical union.

Such a connector may be stamped from a flat strip of malleable metal, such as copper, to form a flat blank having the connector portion formed at one end and opposed ears formed at the other end. The ears are then brought together to form a cylindrical ferrule portion having a longitudinal seam. Since this ferrule portion is to be coined or cold forged onto a conductor, various methods have been proposed to prevent this seam from opening during the crimping operations. If the seam is opened during the crimping operations, a poor mechanical and electrical union results and corrosive substances may enter the opened seam.

The most satisfactory method of preventing the seam from opening during crimping operations is to braze the seam by employing standard brazing alloys, such as silver solder. According to some prior art techniques, the ears are initially butted so that they define a V-shaped groove for receiving the brazing alloy. The alloy may be applied to the seam while the alloy is in the solid state (in a powder or paste form), and then the entire assembly may be heated to a suitable brazing temperature to melt the alloy. Alternately, at least the seam portion of the connector may be heated to the brazing temperature and the seam may be touched with a solid rod of brazing material until a portion of the rod melts to fill the seam.

As distinguished from welding techniques, the base metal or alloy to be joined is not melted. The brazing alloy is melted and wets the base metal. Although the base metal is not melted, intermetallic compounds or solid solutions are formed at the liquid-solid interface. The strength of the brazed seam depends upon the degree of wetting of the base metal by the brazing alloy.

According to prior art techniques, the edges of the ears which form the longitudinal ferrule seam are cut perpendicular to the plane of the strip. A V-shaped groove is formed by butting the ears, but this seam presents a minimum surface area to the brazing alloy and poor surface wetting results. The smooth-walled V, moreover, provides less actual bonding area for the brazing alloy and even when proper wetting is achieved, the seam may fail under the tensile and sheer forces during crimping operations.

It is an object of this invention to overcome many of these prior art problems.

It is a more specific object of this invention to provide a seam for brazing that presents a relatively large surface area to a brazing alloy so that the brazing alloy wets the base metal by capillary force to thereby provide a mechanically strong seam.

According to the present invention, the surface area of the abutting base metal is increased within specified limits, since a greatly increased surface area requires too much braze metal and may reduce the capillary attraction between the liquid brazing alloy and the base metal.

These and other objects of the invention will become apparent from the following detailed description and from the accompanying drawings.

Figure 1:
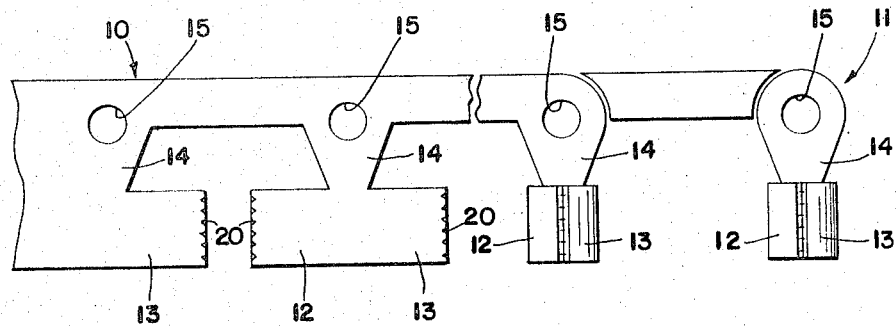
FIGURE 1 is a plan view of a sheet metal strip illustrating the forming operations for producing an electrical connector according to one aspect of the present invention, with certain portions omitted for simplicity.
Figure 2:
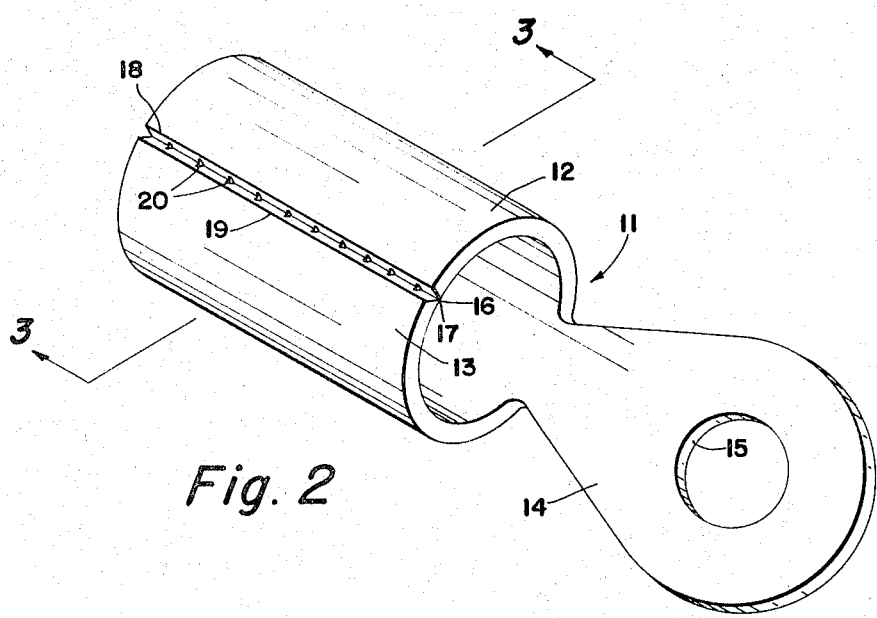
FIGURE 2 is an enlarged, perspective view of a connector according to this invention.
Figure 3:
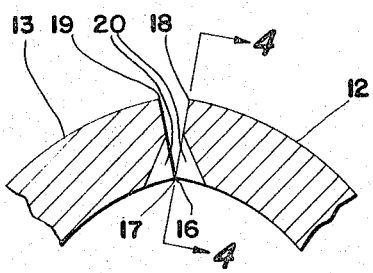
FIGURE 3 is a fragmentary, cross sectional view, the plane of the section being indicated by the line 3—3 in FIGURE 2.

Referring now to the drawings, and particularly to FIGURES 1 through 5, a sheet metal strip 10 is illustrated (FIGURE 1). The strip 10 is fed into a suitable forming machine having dies for progressively forming an electrical terminal connector 11. Portions of the strip 10 are punched out to form laterally extending ears 12 and 13, a flat projecting tongue portion 14, and an aperture 15 for receiving a terminal post. The ears 12 and 13 are progressively bent or rolled into a cylindrical form so that a bottom edge 16 (FIGURES 2 and 3) of the ear 12 is in abutment with a bottom edge 17 of the ear 13. A top edge 18 of the ear 12 is spaced from a top edge 19 of the ear 13 so that a longitudinal V-shaped groove is formed by the ears 12 and 13.

As the ears 12 and 13 are stamped from the sheet 10, they are provided with a multiplicity of notches or serrations 20 on their edges 16 and 17, respectively. The provision of the notches 20 on the ears 12 and 13 is simultaneous with the stamping operation that forms these ears, and the stamping die is provided with suitable means to form the serrations 20. The serrations 20 not only increase the surface area of the V-shaped seam, so that a greater surface area is presented to the brazing alloy, but also provide a capillary surface for increased wetting of the base metal.

As will hereinafter become apparent, the particular shape of the serrations 20 is not critical, but the serrations should be formed within specified limits.

Figure 4:
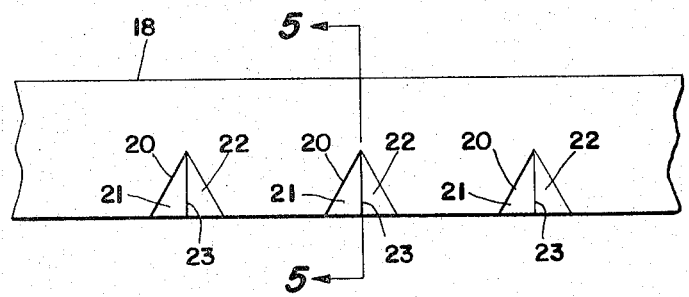
FIGURE 4 is a cross sectional, fragmentary view of a connector, the plane of the section being indicated by the line 4—4 in FIGURE 3.
Figure 5:
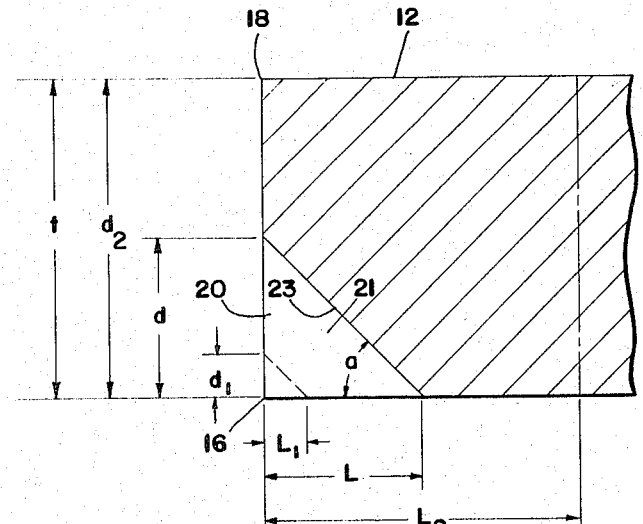
FIGURE 5 is a fragmentary, cross sectional view of the connector, the plane of the section being indicated by the line 5—5 in FIGURE 4.

Referring now to FIGURES 4 and 5, a serration 20 is shown in detail. The serration 20 is defined by a pair of right triangular faces 21 and 22, which are cut into the edge 16 and which have a common hypotenuse 23. The hypotenuse 23 defines an angle $a$ with the bottom or inside surface of the ear. The hypotenuse 23, furthermore, intersects the front face of the ear at a distance $d$ from the edge 16 and intersects the bottom or inside surface of the ear at a distance L from the edge 16.

The relationship shown in solid outline in FIGURES 4 and 5 is the preferred arrangement of the serration 20. In this instance, the angle $a$ is about 45° and the distances $d$ and L are equal to each other and are equal to one-half the thickness $t$ of the ear. As was previously indicated, however, these relationships may vary within certain specified limits. It should be appreciated that if the serrations are cut too deeply into the ears 12 and 13 to provide a drastically irregular surface to be brazed, too much brazing material will be required in the seam area and the irregular surface will not exhibit sufficient capillarity to be thoroughly wetted by the brazing alloy. It has been found that the hypotenuse 23 may intersect the inner surface of the ear 12 at any point along that surface between a position where it is spaced a distance $L_1$ from the edge 16 to a point $L_2$ from the edge 16. The distance $L_1$ is equal to the thickness $t$ divided by 10, and the distance $L_2$ is equal to the thickness $t$.

Figure 6:
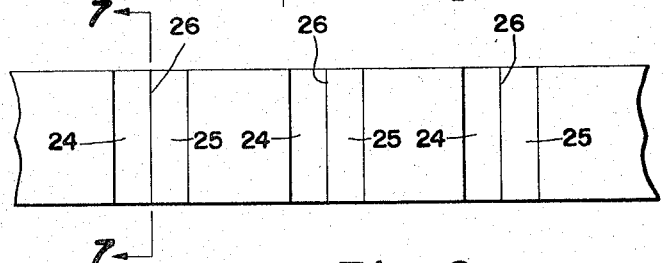
FIGURE 6 is a view similar to FIGURE 4, but showing a ferrule seam according to a further aspect of this invention.
Figure 7:
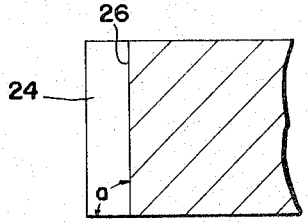
FIGURE 7 is a fragmentary, cross sectional view of a connector, the plane of the section being indicated by the line 7—7 in FIGURE 6.

It has also been found that the hypotenuse 23 may intersect the end face of the ear 12 at any point along that surface between an intersecting position that is spaced a distance $d_1$ from the edge 16 to an intersecting position that is spaced a distance $d_2$ from the edge 16. The distance $d_1$ is equal to the distance $L_1$ and the distance $d_2$ is equal to the distance $L_2$. Within these limits, the hypotenuse 23 need not define an angle of 45° with respect to the inner surface of the ear 12. For example, the hypotenuse 23 may intersect the end face of the ear 12 at a point that is spaced a distance $d_1$ from the edge 16 and intersect the inner surface of the ear 12 at a point that is spaced a distance $L_2$ from the edge 16. The hypotenuse 23, furthermore, need not intersect the end face of the ear 12, but may intersect the top or outer surface of the ear. Obviously in such a case the faces 21 and 22 would no longer be triangles, but would be quadrilaterals, and the line of intersection 23 would define a common side of the quadrilaterals. If, in such a case, the angle $a$ is equal to 90°, the faces 21 and 22 would be rectangles. Thus, as is illustrated in FIGURES 6 and 7, the angle $a$ is equal to 90° and the serrations, which are cut into an ear, are defined by rectangular faces 24 and 25 having a common side 26.

In the examples given above, the hypotenuse 23 and the side 26 are lines that define the depth or extent of the serration in the ear 12. This serration depth, however, need not be defined by a line, but may be a plane or curved surface as long as all portions of such surfaces are within the limits set forth above.

The elimination of portions of the edge 16 in the manner indicated provides capillary flow paths for the brazing alloy so that the alloy will wet not only the V-shaped seam that is defined by the end faces of the ears 12 and 13, but will also wet zones along the inside surface of the ferrule that is defined by the ears. This serves to insure a tightly locked seam that will not spread apart during a later crimping operation.

Obviously, many modifications and variations of the invention will become apparent to those skilled in the art in the light of the above teachings. Therefore, it is to be understood that, within the spirit and scope of the appended claims, the invention may be practiced otherwise than as specifically shown and described.

What is claimed is:

1. A method of forming a brazed seam between two sheet metal edges, comprising the steps of providing serrations along one edge of at least one of the sheets, said serrations extending inwardly into said edge for a distance that is not substantially less than one-tenth of the thickness of the sheet and is not substantially greater than the thickness of the sheet, butting the serrated edge of one of the sheets with an edge of the other sheet so that a V-shaped groove is formed therebetween with the serrations opening into the groove, wetting substantially all of the surface of said groove and said serrations and filling the same with a liquid brazing alloy, and cooling said liquid alloy to form a brazed seam.

2. A method of forming a brazed seam between two sheet metal edge portions, each of said portions having substantially parallel top and bottom surfaces and an edge surface between said top and bottom surfaces, comprising the steps of providing serrations along one edge portion of at least one of the sheets, said serrations extending inwardly into at least said bottom and edge surfaces so that their inward extent is between about $t/10$ and $t$ measured along the bottom surface from said edge surface, between about $t/10$ and $t$ measured along the edge surface from said bottom surface to said top surface, and between about 0 and $t$ measured along said top surface from said edge surface, where $t$ equals the thickness of the strip, butting said sheets at the intersection between their bottom and edge surfaces so that a V-shaped butt seam is thereby formed, wetting substantially all of the surface of said butt seam and said serrations and filling the same with a liquid brazing alloy, and cooling said liquid alloy to form a brazed seam.

3. A method of forming a brazed seam between two sheet metal edge portions, each of said portions having substantially parallel top and bottom surfaces and an edge surface between said top and bottom surfaces, comprising the steps of providing serrations along one edge portion of at least one of the sheets, said serrations having right triangular faces and a common hypotenuse, said hypotenuse extending inwardly into said bottom and edge surfaces so that its inward extent is between about $t/10$ and $t$ measured along the bottom surface from said edge surface, and between about $t/10$ and $t$ measured along the edge surface from said bottom surface to said top surface, where $t$ equals the thickness of the strip, butting said sheets together at the intersection between their bottom and edge surfaces so that a V-shaped butt seam is thereby formed, wetting substantially all of the surface of said butt seam and said serrations and filling the same with a liquid brazing alloy, and cooling said liquid alloy to form a brazed seam.

4. A method of forming a brazed seam between two sheet metal edge portions, each of said portions having substantially parallel top and bottom surfaces and an edge surface between said top and bottom surfaces, comprising the steps of providing serrations along one edge portion of at least one of the sheets, said serrations being defined by quadrilateral faces having a common side, said common side extending inwardly into said top, bottom, and edge surfaces so that its inward extent is between about $t/10$ and $t$ measured along the bottom surface from said edge surfaces and between about 0 and $t$ measured along said top surface from said edge surface, where $t$ is equal to the thickness of said strip, butting said sheets together at the intersection between their bottom and edge surfaces so that a V-shaped butt seam is thereby formed, wetting substantially all of the surface of said butt seam and said serrations and filling the same with a liquid brazing alloy, and cooling said liquid alloy to form a brazed seam.

5. A method of forming a brazed seam between two sheet metal edge portions, each of said portions having substantially parallel top and bottom surfaces and an edge surface between said top and bottom surfaces, comprising the steps of providing serrations along one edge portion of at least one of the sheets, said serrations being defined by a pair of triangles having a common hypotenuse, said hypotenuse extending between said edge surface and said bottom surface and intersecting said surfaces at points equal to one-half of the thickness of the strip measured from the intersection of said bottom and edge surfaces, butting the serrated edge of one of these sheets with an edge of the other sheet so that a V-shaped butt seam is thereby formed, wetting substantially all of the surface of said butt seam and said serrations and filling the same with a liquid brazing alloy, and cooling said liquid brazing alloy to form a brazed seam.

References Cited by the Examiner
UNITED STATES PATENTS 1,754,721   4/1930   Linden _____ 29—482

JOHN F. CAMPBELL, *Primary Examiner.*

L. J. WESTFALL, *Assistant Examiner.*